(12) United States Patent
Raggio et al.

(10) Patent No.: US 12,085,433 B2
(45) Date of Patent: Sep. 10, 2024

(54) FLOW REGULATION TOOL

(71) Applicants: John Raggio, Spring, TX (US); Pavel Nazarenko, Houston, TX (US); Tyler Shirk, Houston, TX (US)

(72) Inventors: John Raggio, Spring, TX (US); Pavel Nazarenko, Houston, TX (US); Tyler Shirk, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 434 days.

(21) Appl. No.: 17/166,650

(22) Filed: Feb. 3, 2021

(65) Prior Publication Data
US 2022/0243581 A1  Aug. 4, 2022

(51) Int. Cl.
| | |
|---|---|
| *G01F 1/88* | (2006.01) |
| *E21B 34/06* | (2006.01) |
| *G01F 1/76* | (2006.01) |
| *E21B 47/06* | (2012.01) |

(52) U.S. Cl.
CPC .......... *G01F 1/88* (2013.01); *E21B 34/06* (2013.01); *G01F 1/76* (2013.01); *E21B 47/06* (2013.01)

(58) Field of Classification Search
CPC ... G01F 1/76; G01F 1/88; E21B 34/06; E21B 47/06
See application file for complete search history.

(56) References Cited

U.S. PATENT DOCUMENTS

| | | | | |
|---|---|---|---|---|
| 4,359,094 A | * | 11/1982 | Risinger | E21B 43/14 166/313 |
| 4,381,822 A | * | 5/1983 | Fisher, Jr. | E21B 34/105 166/326 |
| 4,453,599 A | * | 6/1984 | Fredd | E21B 33/1294 166/321 |

(Continued)

FOREIGN PATENT DOCUMENTS

| | | | | |
|---|---|---|---|---|
| WO | WO-8906740 A | * | 7/1989 | E21B 23/006 |

OTHER PUBLICATIONS

Notification of Transmittal of the International Search Report and the Written Opinion of the International Searching Authority, or the Declaration; PCT/US2022/070506; Mail date: May 19, 2022; 9 pages.

*Primary Examiner* — Jill E Culler
(74) *Attorney, Agent, or Firm* — CANTOR COLBURN LLP

(57) ABSTRACT

A flow regulation tool including a ported landing nipple having a port therethrough, a retrievable choke assembly disposed within the housing, the choke assembly including a choke member and a pressure port, a fluid flow path within the housing that includes a first direction of flow in a first portion of the flow path and a second direction of flow in a second portion of the flow path, and a sensor gauge having first and second pressure sensing points disposed in the retrievable choke assembly, the first pressure sensing point exposed to pressure upstream or downstream of the choke member depending upon fluid flow direction and the second pressure sensing point exposed to pressure at the other of upstream or downstream of the choke member depending upon fluid flow direction, one of the first and second pressure sensing points exposed to the corresponding pressure through the pressure port.

13 Claims, 3 Drawing Sheets

(56) References Cited

U.S. PATENT DOCUMENTS

| | | | |
|---|---|---|---|
| 4,964,460 A | | 10/1990 | Armell et al. |
| 5,706,892 A | * | 1/1998 | Aeschbacher, Jr. ... E21B 33/127 |
| | | | 166/69 |
| 5,887,657 A | | 3/1999 | Bussear et al. |
| 6,250,138 B1 | * | 6/2001 | Shwe .................... E21B 49/082 |
| | | | 166/264 |
| 6,508,312 B1 | * | 1/2003 | Latiolais, Jr. ......... E21B 21/103 |
| | | | 166/373 |
| 9,518,445 B2 | * | 12/2016 | Noske ................... E21B 21/103 |
| 9,945,225 B2 | * | 4/2018 | Kabatek ................ E21B 33/124 |
| 2001/0050170 A1 | | 12/2001 | Woie et al. |
| 2002/0070026 A1 | | 6/2002 | Fenton et al. |
| 2011/0011174 A1 | | 1/2011 | Boe et al. |

* cited by examiner

FLOW REGULATION TOOL

BACKGROUND

In the resource recovery industry, the regulation of fluids flowing into and out of a tubing string in a borehole is an essential activity for which many tools have been devised over time. Some tools work well while others are inadequate but regardless the art is always interested in new solutions with lower cost and greater flexibility while retaining function.

SUMMARY

An embodiment of a flow regulation tool including a ported landing nipple having a port extending from an inside diameter of the ported landing nipple to a volume radially outwardly of the ported landing nipple, a retrievable choke assembly disposed within the housing, the choke assembly including a choke member and a pressure port, a fluid flow path within the housing that includes a first direction of flow in a first portion of the flow path and a second direction of flow in a second portion of the flow path, and a sensor gauge having first and second pressure sensing points sensing point disposed in the retrievable choke assembly, the first pressure sensing point exposed to pressure upstream or downstream of the choke member depending upon fluid flow direction and the second pressure sensing point exposed to pressure at the other of upstream or downstream of the choke member depending upon fluid flow direction, one of the first and second pressure sensing points exposed to the corresponding pressure through the pressure port.

An embodiment of a choke assembly including first and second pressure sensing points, a regulated flow housing having a pressure passage and a flow bore, the pressure passage extending from the flow bore to one of the first and second sensing points, and a choke member between the regulated flow bore and the other of the first and second sensing points.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
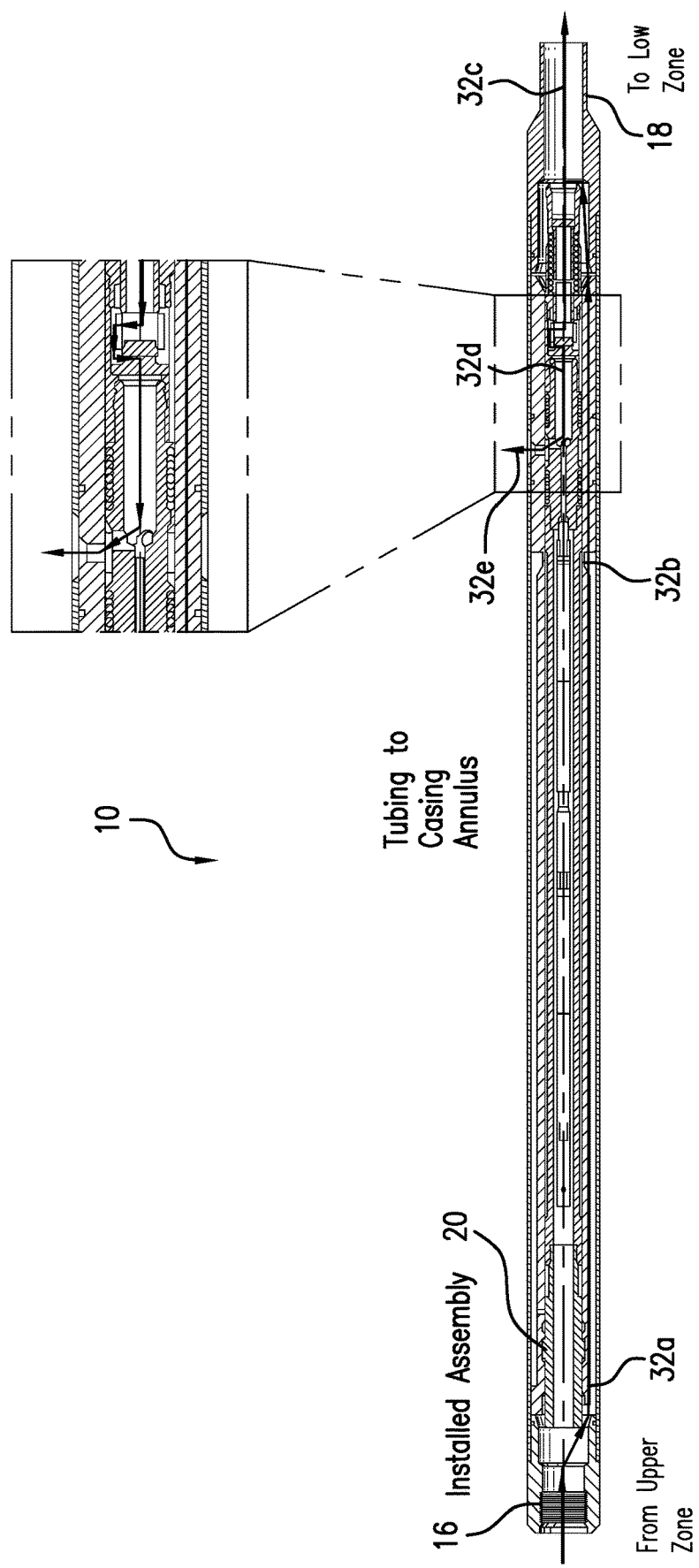
FIG. 1 is a cross section view of a retrievable flow regulation tool as disclosed herein including a retrievable flow regulation subassembly disposed in a ported landing nipple.
Figure 2:
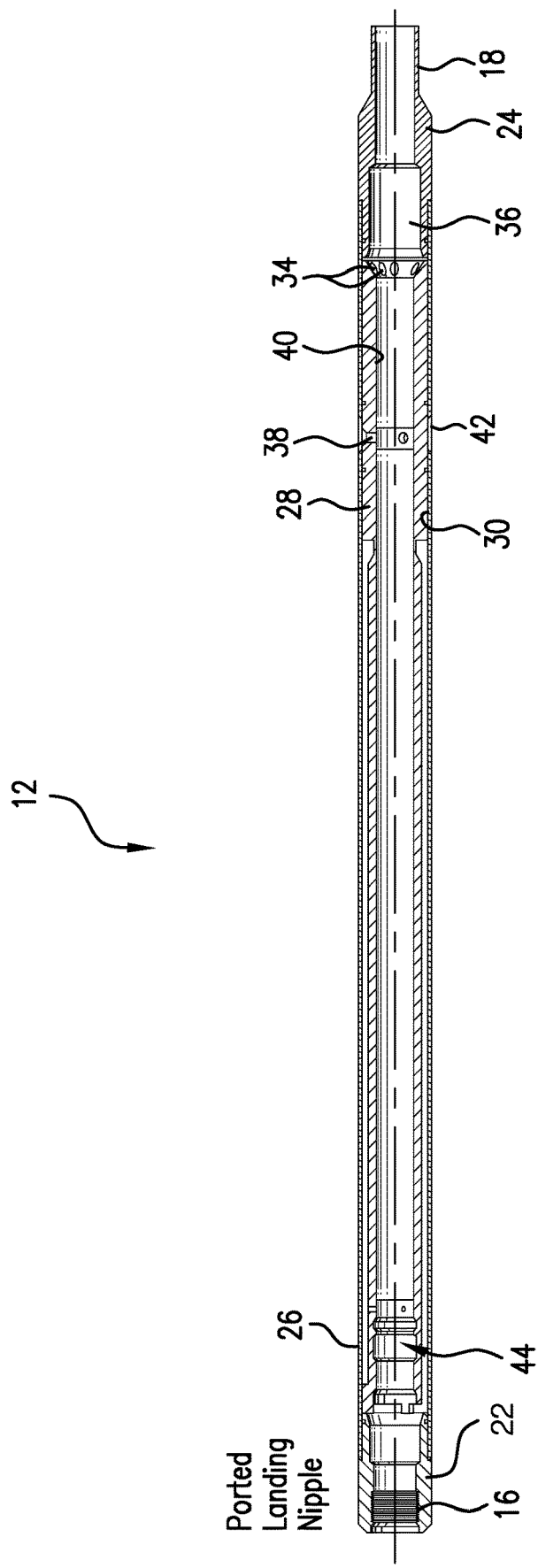
FIG. 2 is a cross sectional view of the ported landing nipple shown in FIG. 1 by itself.
Figure 3:
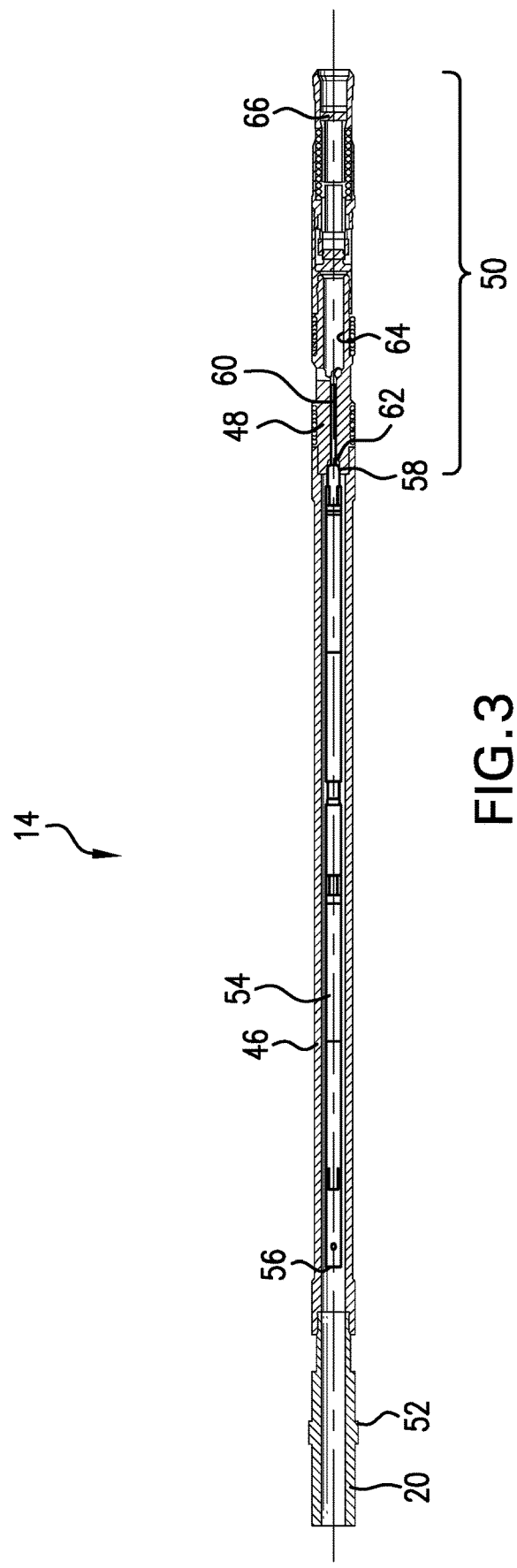
FIG. 3 is a cross sectional view of the retrievable flow regulation subassembly shown in FIG. 1 by itself.

Referring to FIG. 1, a flow regulation tool 10 including a ported landing nipple 12 (identified only in FIG. 2 for clarity) and a retrievable choke assembly 14 disposed therein. The ported landing nipple 12 is configured to be disposed as a part of a tubing string (not otherwise illustrated that extends from the ported landing nipple uphole and sometimes downhole therefrom through threaded connections 16 and 18, respectively, on the ported landing nipple 12. For ease of understanding, FIG. 2 illustrates the ported landing nipple 12 alone while FIG. 3 illustrates the retrievable choke assembly 14 alone. For purposes of this disclosure, the term "retrievable" means the retrievable choke assembly 14 is anchored inside the ported landing nipple 12 by a lock subassembly 20, which is a device that can be removed from the ported landing nipple 12 using slickline, wireline, or coiled tubing—without removal of the ported landing nipple 12 or the string in which it is disposed.

Referring to FIG. 2, the ported landing nipple 12 can be considered clearly. The nipple 12 includes a first connector 22 and a second connector 24. IN an embodiment, the first connector may be a box sub and the second connector may be a pin sub 24, or the thread forms may be reversed or may be the same on both ends of the nipple 12. The nipple 12 also includes a housing 26 and a ported mandrel 28. The ported mandrel 28 includes flow pathways 30 that are in some places visible in the FIG. 2 cross section and in other places not visible but shown via flow arrows 32a-e in FIG. 1. Pathways 30 terminate at flow apertures 34 at a downhole end of the ported mandrel 28. Through apertures 34, fluid is dumped into a manifold area 36 from which flow may continue in an uphole or downhole direction (see particularly arrow 32c indicating bidirectional flow. Further with regard to mandrel 28, a port 38 is disposed through a radial thickness of the mandrel 28 providing fluid continuity between the inside diameter ("ID") 40 of the mandrel 28 and an orifice 42 in the housing 26 such that fluid flowing through the port 38 and orifice 42 will enter a tubing-to-casing annular space (an annulus between the tubing and the casing (not shown but well understood to be radially outwardly disposed of the tubing) or a tubing-to-open hole annular space. Finally, the mandrel 28 includes a lock profile 44 configured for engagement with the choke assembly 14 discussed below.

Referring to FIG. 3, the choke assembly 14 is illustrated apart from the ported nipple 12 for ease of understanding. Assembly 14 includes the lock subassembly 20, a spacer 46, a regulated flow housing 48 and a choke subassembly 50. The lock subassembly 20 presents a lock profile (or other anchoring configuration such as a packer or slip system) 52 that is configured and dimensioned to lockably interact with the lock profile 44 in the in the ported mandrel 28 when the choke assembly 14 is disposed within the ported landing nipple 12. The spacer 46 is dimensioned to contain a gauge 54 that measures pressure both upstream and downstream of a choke member 66 of the choke subassembly 50. In an embodiment, the gauge 54, that may be passively powered in one embodiment, disposes one pressure sensing point 56, 58 on each end of the gauge 54. Which sensing point will be upstream and which downstream is dictated by the overall direction of flow of fluid in the tool 10. Where fluid is flowing downhole from surface or an intermediate position between the tool 10 and the surface then sensing point 56 is upstream and 58 is downstream. Where alternatively the fluid flow comes from the formation or the annulus radially outwardly of the ported landing nipple 12, sensing point 58 is upstream and sensing point 56 is downstream. In an embodiment where fluid flows from surface downhole, the upstream sensing point 56 measures pressure of fluid incident the gauge from the uphole end of the tool 10. The downstream sensing point 58 on the other hand, measures pressure of fluid incident the gauge 54 through a pressure passage 60 in the regulated flow housing 48. The passage 60 extends through a part of the regulated flow housing 48 from an uphole end 62 thereof to a flow bore 64 thereof, the flow bore 64 being located with respect to fluid flow in a downstream position relative to the choke member 66 of the choke subassembly 50. Within the choke subassembly 50 and excluding the regulated flow housing 48, there are a number of components illustrated that closely resemble components of a choke subassembly commercially available from Baker Hughes, Houston, Texas and known under the product name Model DSJ-13/23 Flow Regulator In view hereof, those internal components need not be described in detail. The description of the possible flow directions in combination with the discussion of flow in one embodiment is considered to fully apprise one of ordinary skill in the art of the nuances of the disclosed tool with flow in the opposite direction without the need to repeat the same discussion with the upstream and downstream terms reversed.

Referring back to FIG. 1, the tool 10 is illustrated fully assembled. In this condition, the tool 10 may be threaded into a tubing string to be run in hole. It is to be understood, however, that it is also possible to only make up the ported landing nipple 12 in a tubing string and run the choke subassembly 14 later to land in the nipple 12 where it can be locked in place with the lock subassembly 20.

In use, the tool 10 is disposed in a tubing string that is itself disposed in a casing string (not shown) such that a tubing-to-casing annulus is formed. Fluid may of course go to many different places from the tubing-to-casing annulus including the formation or other annuluses, etc. Where the fluid goes beyond the edge of the landing nipple 12 or beyond the uphole end of the tool 10 is not germane to the disclosure. The fluid flowing in the tubing string may be flowed into (or out of with reversal of the choke subassembly 50 components) the tubing-to-casing annulus in a regulated way through the tool 10 while also providing information to the operator in the form of pressure information as well as flow rate information, and temperature information. It is to be appreciated that in FIG. 1, the flow paths are indicated with arrows 32 to show that a first portion of the flow path is in a first direction and a second portion of the flow path is substantially in the opposite direction. While shown with the arrow heads indicating a flow direction from uphole to downhole, they can also be reversed to show flow in the opposite direction in the same flow pathways. In such case all arrowheads would be reversed except for the right hand arrow head on path direction 32e which arrow head points downhole out of the tool 10. Flow information is calculated based upon the different pressure readings of the pressure sensing points 56 and 58. In the case of fluid flow to the annulus, the sensing point 56 sees upstream pressure and sensing point 58 sees downstream pressure but in the case of fluid flow from the annulus, the sensing point 58 will see the upstream pressure and sensing point 56 will see the downstream pressure. Regardless of flow direction, regulation, pressure and flow rate are easily achievable with the tool 10. In some embodiments, the gauge will have a memory circuit near or on board to record information later available for download upon retrieval of the choke assembly 14 and a power supply which may be near or on board, the term "near" meaning still within the extent of the ported landing nipple 12. In other embodiments, the gauge may include a wired or wireless communication medium to allow delayed or real time communication of data perceived at the gauge to remote locations, for example, a surface location. In some embodiments the power supply may be a tether for remote power or a battery for local power while in others the power supply may be from near power generation devices such as piezo electric devices, turbines, etc.

It is significant to note that the choke assembly 14 is retrievable from the ported landing nipple 12 as noted above leaving a fully open ID ported nipple housing 12 for subsequent operations.

Set forth below are some embodiments of the foregoing disclosure:

Embodiment 1: A flow regulation tool including a ported landing nipple having a port extending from an inside diameter of the ported landing nipple to a volume radially outwardly of the ported landing nipple, a retrievable choke assembly disposed within the housing, the choke assembly including a choke member and a pressure port, a fluid flow path within the housing that includes a first direction of flow in a first portion of the flow path and a second direction of flow in a second portion of the flow path, and a sensor gauge having first and second pressure sensing points disposed in the retrievable choke assembly, the first pressure sensing point exposed to pressure upstream or downstream of the choke member depending upon fluid flow direction and the second pressure sensing point exposed to pressure at the other of upstream or downstream of the choke member depending upon fluid flow direction, one of the first and second pressure sensing points exposed to the corresponding pressure through the pressure port.

Embodiment 2: The tool as in any prior embodiment, wherein the first and second directions are opposing.

Embodiment 3: The tool as in any prior embodiment, wherein the sensor gauge includes a memory circuit.

Embodiment 4: The tool as in any prior embodiment, wherein the sensor gauge includes a communication medium.

Embodiment 5: The tool as in any prior embodiment, wherein the sensor gauge includes a power source.

Embodiment 6: The tool as in any prior embodiment, wherein the source is a battery.

Embodiment 7: The tool as in any prior embodiment, wherein the choke member regulated fluid flow therethrough.

Embodiment 8: The tool as in any prior embodiment, further including a lock subassembly.

Embodiment 9: A method for regulating fluid flow in a borehole including running a tool as in any prior embodiment, monitoring pressure upstream and downstream of the choke member.

Embodiment 10: The method as in any prior embodiment further comprising retrieving the choke assembly.

Embodiment 11: The method as in any prior embodiment further comprising downloading data from the choke assembly.

Embodiment 12: The method as in any prior embodiment further comprising calculating flow rate from different pressures at the first and second pressure sensing points.

Embodiment 13: A choke assembly including first and second pressure sensing points, a regulated flow housing having a pressure passage and a flow bore, the pressure passage extending from the flow bore to one of the first and second sensing points, and a choke member between the regulated flow bore and the other of the first and second sensing points.

Embodiment 14: The choke assembly as in any prior embodiment, further including a lock subassembly connected to the regulated flow housing.

Embodiment 15: The choke assembly as in any prior embodiment, a spacer disposed between the lock assembly and the regulated flow housing and a gauge disposed within the spacer, the gauge connected to the first and second pressure sensing points.

Embodiment 16: The choke assembly as in any prior embodiment, wherein the gauge includes a power source.

Embodiment 17: The choke assembly as in any prior embodiment, wherein the gauge includes a memory circuit.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A flow regulation tool comprising:
    a ported landing nipple having a port extending through a radial thickness of the ported landing nipple from an inside diameter of the ported landing nipple to a volume radially outwardly of the ported landing nipple;
    a retrievable choke assembly disposed within the ported landing nipple, the choke assembly including a choke member and a pressure port;
    a first fluid flow path within the ported landing nipple that includes at one end a manifold area through which fluid flows bidirectionally with one direction being a second fluid flow path to a choke subassembly including the choke member;
    a sensor gauge having first and second pressure sensing points disposed in the retrievable choke assembly, the first pressure sensing point exposed to pressure upstream or downstream of the choke member depending upon fluid flow direction and the second pressure sensing point exposed to pressure at the other of upstream or downstream of the choke member depending upon fluid flow direction, one of the first and second pressure sensing points exposed to the corresponding pressure through the pressure port.

2. The tool as claimed in claim 1 wherein the first and second directions are opposing.

3. The tool as claimed in claim 1 wherein the sensor gauge includes a memory circuit.

4. The tool as claimed in claim 1 wherein the sensor gauge includes a communication medium.

5. The tool as claimed in claim 1 wherein the sensor gauge includes a power source.

6. The tool as claimed in claim 5 wherein the source is a battery.

7. The tool as claimed in claim 1 wherein the choke member regulated fluid flow therethrough.

8. The tool as claimed in claim 1 further including a lock subassembly.

9. A method for regulating fluid flow in a borehole comprising:
    running a tool as claimed in claim 1;
    monitoring pressure upstream and downstream of the choke member.

10. The method as claimed in claim 9 further comprising retrieving the choke assembly.

11. The method as claimed in claim 10 further comprising downloading data from the choke assembly.

12. The method as claimed in claim 11 further comprising calculating flow rate from different pressures at the first and second pressure sensing points.

13. The tool as claimed in claim 1, wherein the first or second pressure point is located in the first fluid flow path.

* * * * *